United States Patent
Koch

(10) Patent No.: US 7,329,306 B1
(45) Date of Patent: Feb. 12, 2008

(54) PROCESS FOR SAFE MEMBRANE OPERATION

(75) Inventor: David R. Koch, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 433 days.

(21) Appl. No.: 11/001,731

(22) Filed: Dec. 2, 2004

(51) Int. Cl.
*B01D 53/22* (2006.01)

(52) U.S. Cl. .................. 95/51; 95/45; 95/284; 95/288; 96/4; 96/11; 55/DIG. 15; 55/DIG. 25

(58) Field of Classification Search .............. 95/45, 95/51, 273, 284, 288; 96/4, 10, 11; 55/DIG. 15, 55/DIG. 17, DIG. 25
See application file for complete search history.

(56) References Cited

U.S. PATENT DOCUMENTS

| | | | | |
|---|---|---|---|---|
| 4,822,382 A | | 4/1989 | Nelson | 55/16 |
| 4,881,953 A | | 11/1989 | Prasad et al. | 55/16 |
| 5,030,251 A | | 7/1991 | Rice et al. | 55/16 |
| 5,096,468 A | * | 3/1992 | Minhas | 95/51 |
| 5,129,921 A | * | 7/1992 | Baker et al. | 95/45 |
| 5,383,956 A | * | 1/1995 | Prasad et al. | 95/45 |
| 5,611,842 A | * | 3/1997 | Friesen et al. | 95/45 |
| 5,669,959 A | * | 9/1997 | Doshi et al. | 95/51 |
| 5,888,272 A | * | 3/1999 | Prasad et al. | 95/45 |
| 6,149,714 A | * | 11/2000 | Kobayashi | 95/288 |
| 6,478,852 B1 | * | 11/2002 | Callaghan et al. | 95/54 |
| 6,572,679 B2 | * | 6/2003 | Baker et al. | 95/51 |
| 6,648,944 B1 | * | 11/2003 | Baker et al. | 95/51 |

* cited by examiner

*Primary Examiner*—Jason M. Greene
(74) *Attorney, Agent, or Firm*—Mark Goldberg

(57) ABSTRACT

A process is disclosed for shut-down of a membrane separation zone comprising a non-permeate side and a permeate side and processing a feed stream comprising a non-permeable component, a less-readily permeable, condensable component, and a readily permeable component. When the feed stream is not passed to the membrane separation zone, a purge stream is passed to the non-permeate side of the membrane separation to remove a residual gas stream and thereby prevent condensation of the less-readily permeable, condensable component upon depressurization and/or cooling of the membrane separation zone. This purge stream is provided by taking a feed stream, lowering its pressure which leads to cooling and then passing the cooled stream through a gas-liquid separator to removed condensed liquids. The need is reduced for oversizing membrane system which reduces treating costs and prevents permeate damage to membrane surfaces caused by condensation of less-readily permeable, condensable components such as $C_6^+$ hydrocarbons.

10 Claims, 3 Drawing Sheets

PROCESS FOR SAFE MEMBRANE OPERATION

FIELD OF THE INVENTION

This invention relates to a process for safe membrane operation and more particularly relates to a procedure for operating a continuous membrane separation process wherein membrane degradation may be prevented during membrane shut-down, particularly during sudden or unexpected shut-down of the membrane separation zone, and most specifically the invention relates to a method for safe membrane shut-down within a process for the removal of carbon dioxide from light hydrocarbon gases.

BACKGROUND OF THE INVENTION

Permeable membrane processes and systems are known in the art and have been employed or considered for a wide variety of gas and liquid separations. In such operations, a feed stream is brought into contact with the surface of a membrane, and the more readily permeable component of the feed stream is recovered as a permeate stream, with the less-readily permeable component being withdrawn from the membrane system as a non-permeate stream. Membrane separation modules are maintained at operating conditions which result in a non-permeate side pressure at which the feed gas is introduced and the non-permeate stream is withdrawn, and a permeate side pressure at which the permeate stream is withdrawn. The pressure on the non-permeate side of the membrane is higher than the pressure on the permeate side, and the pressure differential between the non-permeate and the permeate sides of the membrane generally determines the degree of separation attained by the membrane separation.

Membranes are widely used to separate permeable components from gaseous feed streams. Examples of such process applications include removal of acid gases from natural gas streams, removal of water vapor from air and light hydrocarbon streams, and removal of hydrogen from heavier hydrocarbon streams. Membranes are also employed in gas processing applications to remove permeable components from a process gas stream. Natural gas as produced from a gas well presents a separations challenge. Often the natural gas is found together with other components such as sulfur compounds, water, and associated gases. The associated gases found in natural gas streams typically include carbon dioxide, hydrogen sulfide, nitrogen, helium, and argon. Generally, these other gas components are separated from the natural gas by bulk methods employing membrane systems.

The inherent simplicity of such fluid separation operations constitutes an incentive to expand the use of membrane systems in commercial operations. In this regard, it will be appreciated that the selectivity and permeability characteristics of such membrane systems must be compatible with the overall production requirements of a given application. It is also necessary, of course, that the membranes exhibit acceptable stability and do not suffer undue degradation of their performance properties in the course of practical commercial operations.

Membranes for gas processing typically operate in a continuous manner, wherein a feed gas stream is introduced to the membrane gas separation module on a non-permeate side of a membrane. The feed gas is introduced at separation conditions which include a separation pressure and temperature which retains the components of the feed gas stream in the vapor phase, well above the dew point of the gas stream, or the temperature and pressure condition at which condensation of one of the components might occur. However, if the flow of the feed gas stream is interrupted, or the feed pressure is suddenly reduced, the residual material within the membrane separation zone could reach its dew point and condensation would then result. The feed gas stream fed to the gas separation membrane may contain a substantial amount of moisture and this moisture and other impurities may cause corrosion, condensation or other damage to instrumentation, piping, pneumatic tools, ventilators and other equipment associated with the gas separation membrane. In certain instances, it may also lead to inferior performance of the gas separation membrane or other equipment, such as adsorption traps. In order to compensate for damage caused by condensation occurring during shut-down of the feed gas stream during the lifetime of a membrane system, such membrane systems are often oversized to compensate for the loss of membrane surface over the useful life of the membrane. However, for high volume gas treating application, this over design of membrane capacity can be very costly, adding millions of dollars to the cost of a membrane system.

In gas drying applications, methods have been disclosed for employing sweep gases to remove moisture from the membrane before it condenses. For example, in air separation applications, which constitute a highly desirable field of use for permeable membranes, oxygen is typically the more readily permeable component of the feed air for particular membranes and is withdrawn as the permeate gas. In such embodiments, nitrogen is the less-readily permeable component and is recovered as non-permeate gas. Liquid water is generally removed from feed air upstream of the membrane by conventional means such as knockout drums. Generally, any water vapor present in the feed air will permeate the membrane resulting in a dry non-permeate gas. In air separation applications, it has been found that the performance characteristics of the membranes are sensitive to the presence of certain contaminants in the feed air stream. Exposure to such contaminants may result in a significant reduction in the permeability of the membrane in use. Fortunately, most contaminants commonly present in ambient air, such as light hydrocarbons, $H_2O$, and $CO_2$, have been found to result in, at most, a modest decrease in membrane permeability. However, heavier hydrocarbons provide a not so benign impact upon a membrane system. The presence of even relatively low concentrations, e.g., less than 1 ppm by volume of $C_{10}^+$, of heavy hydrocarbon oil vapors, such as might enter the feed air stream from an oil lubricated air compressor, can result in rapid and extensive loss of membrane permeability.

In response to such an undesirable decrease in membrane permeability, it is a common practice to increase the size of the active membrane surface area with a safety factor sufficiently large to compensate for the anticipated permeability loss from all sources. Initially, therefore, the membrane system is significantly oversized for the desired product flow, and the feed gas compressor is typically operated in a turndown mode. As permeability degradation of the membrane proceeds, either the operating temperature or pressure, or both, are increased to compensate for the decrease in permeability. Typical membrane systems consist of multiple membrane modules. In some instances, it is necessary or desirable to bypass some of the modules in the membrane system initially so as to reduce excess membrane area employed when the membranes are new and exhibit their full permeability capability and then subsequently to bring such by-passed modules on stream as degradation of the initially employed modules progresses. In such instances, it will be appreciated that, in addition to a significant capital cost penalty associated with the provision of extra membrane surface area and extra membrane modules, such a membrane system must operate over a significant portion of its operating life under off design conditions and the control strategy for such a membrane system is more complex than for a system operating closer to optimum design conditions.

As an alternative to such over designed membrane systems to compensate for degradation in use, attempts have been made to restore lost performance, but such efforts were initially unsuccessful in developing an economically feasible means for restoring the permeability of degraded membranes. Restoring any portion of the degraded membranes would require interruption of the gas treating operation, displacing large quantities of gas. Replacement of degraded membranes is an expensive alternative. Neither over design of the membrane system nor interruption of gas product operations for membrane restoration treatment, or a combination of these approaches is an entirely satisfactory means for overcoming permeability degradation in practical commercial air or other gas separation operations. Further improvement in the response to the problem of membrane degradation is highly desirable.

U.S. Pat. No. 4,881,953 to Prasad et al. discloses an approach to the problem of preventing premature loss of membrane capacity by passing the feed gas mixture through a bed of adsorbent material, such as activated carbon to adsorb contaminants such as heavier hydrocarbon contaminants without the removal of lighter hydrocarbons. Prasad requires that a means for removing moisture from the feed gas be provided because high moisture levels generally limit the ability of activated carbon adsorbents to retain their adsorptive capacity for heavy hydrocarbons.

U.S. Pat. No. 5,030,251 to Rice et al. relates to the operation of a membrane separator which removes water vapor from a moist air feed to produce a drier air product. When such a membrane operation is stopped, some residual water vapor remains in the membrane separator and when the feed flow is resumed, the residual water vapor flows out with the non-permeate stream. This results in a less dry product produced during restarts than during the steady-state operation of the membrane separator. To correct this problem, a portion of the non-permeate product is saved in a storage tank and supplied to the membrane separation at a time when the feed is not being supplied to the separator to purge the residual water vapor between cycles. As disclosed, when the feed cycle is off, the air pressure of the non-permeate side of the separator reduces to atmospheric pressure. Then, because the pressure is in the storage tank is greater than atmospheric, some of the stored non-permeate bleeds back to form the purge stream.

U.S. Pat. No. 5,383,956 to Prasad et al., relates to processes and apparatus for starting up and shutting down membrane gas separation systems treating a wet gas feed gas stream. The process of Prasad et al. employs a membrane dryer module and a gas separation membrane module in various startup sequences and shut-down sequences for drying and separating the feed gas stream. In the shut-down of Prasad et al. which comprises at least one gas separation module and at least one membrane dryer, the flow of the feed gas is stopped to both membrane modules, and the modules are depressurized by removing pressurized gas from the non-permeate sides of the modules. The pressurized gas is allowed to permeate through the respective membrane modules to the permeate sides, followed by purging both the permeate and non-permeate sides of the membrane modules with a dry gas stream.

U.S. Pat. No. 5,669,959 to Doshi et al. provided for a purge stream to be passed to the non-permeate side of the membrane separation zone to remove a residual gas stream and thereby prevent condensation of the less-readily permeable, condensable component of the gas stream. Doshi et al. employs an adsorbent bed or zone to remove the condensable components of the gas stream to be used as the purge stream. While this has been found to be one method to protect the membrane, less expensive means are still being sought that do not involve the need to replace or regenerate an adsorbent bed.

When a natural gas stream is processed in a membrane separation zone, the presence of heavy hydrocarbons, such as $C_6^+$ hydrocarbons, and particularly $C_{10}^+$ hydrocarbons under certain conditions such as reduction of temperature and pressure, or a change in composition can result in the loss of membrane capacity and often permanent damage to the membrane. Processes are sought to prevent such damage to the membrane separation unit beyond those taught by the prior art.

It is an object of the invention, therefore, to provide an improved membrane system and process for overcoming the problem of degradation of permeability during hydrocarbon gas production operations such as in natural gas production.

It is another object of the invention to provide a membrane system and process obviating the need for significant over design or for premature replacement of degraded membrane modules.

It is a further object of the invention to provide a membrane system and process for maintaining membrane permeability and minimizing the need for the interruption of gas producing operations for the treatment of membrane modules for restoration of the permeability characteristics thereof.

It is another object of the invention to provide an inexpensive process for overcoming the degradation of permeability during hydrocarbon gas production operations such as natural gas production.

SUMMARY OF THE INVENTION

The invention provides a process for the safe shut-down of a membrane separation system which minimizes the risk of damage to the membrane. Membranes that process hydrocarbon streams that comprise less-readily permeable, condensible components such as $C_6^+$ hydrocarbons in an environment in which condensing of such hydrocarbons may occur, can be subject to catastrophic failure when such hydrocarbon condensation is followed by conventional shut-down procedures such as depressurization of the non-permeate side. Depressurization of the membrane upon shut-down is desirable when it occurs simultaneously with purging of the non-permeate zone of the membrane unit. By the present invention, it has been found that a reduction in pressure of the sales gas producing a significant reduction in temperature of the gas, followed by the use of a gas/liquid separator can provide an effective means to produce a purge gas to sweep the membrane of residual gas before the undesirable components can condense on the membrane. An additional degree of protection can be provided to the system by injecting nitrogen gas into the purge gas flow. It has been found that this procedure avoids degradation of the membrane and maintains selectivity and permeability of the membrane through multiple shut-downs of the membrane separation system.

In a broad aspect of the present invention is a process for the safe shut-down of a membrane separation zone for the removal of a readily permeable component from a feed gas mixture comprising the readily permeable component, a non-permeable component, and a less-readily permeable, condensible component. The process comprises intermittently passing the feed gas mixture at separation conditions to a membrane separation zone to provide a non-permeate stream and a permeate stream. The membrane separation zone has a non-permeate side and a permeate side. The non-permeate stream is withdrawn from the non-permeate side of the membrane separation zone and a permeate stream at a permeate pressure is withdrawn from the permeate side of the membrane separation zone. Upon shut-down of the system, a portion of the gas mixture, preferably a sales gas flow that is depleted in carbon dioxide, is sent through a valve to reduce the pressure of the as and subsequently cool the gas into a two phase (gas/liquid) stream to be separated in a gas liquid separator with de-mister pads or other separation means known to one skilled in the art. The remaining gas becomes a purge gas stream. When the feed gas mixture is not passed to the membrane separation zone, this purge stream reduced in the less-readily permeable, condensible component is passed at a pressure greater than the permeate pressure to the non-permeate side of the membrane separation zone to remove at least a portion of a residual gas remaining in the non-permeate side of the membrane separation zone before the residual gas condenses in the membrane separation zone.

In a specific embodiment of the invention, the invention relates to a process used intermittently for the removal of carbon dioxide from a hydrocarbon gas feed stream to produce a sales gas stream. The hydrocarbon gas feed mixture comprises $C_1$ to $C_6$ hydrocarbons, carbon dioxide and $C_6^+$ hydrocarbons. The $C_6^+$ hydrocarbons are less-readily permeable and condensible. The hydrocarbon gas feed mixture is passed to a membrane separation zone having a non-permeate zone and a permeate zone at separation conditions to provide a non-permeate stream withdrawn from the non-permeate zone and a permeate stream at a permeate pressure withdrawn from the permeate zone. The non-permeate stream comprises $C_6^+$ hydrocarbons and a reduced amount of carbon dioxide relative to the hydrocarbon gas feed mixture. The permeate stream is enriched in carbon dioxide relative to the hydrocarbon gas feed mixture. Intermittently, when the hydrocarbon feed mixture is not passed to the membrane separation zone, a purge stream reduced in $C_6^+$ hydrocarbons relative to the $C_6^+$ hydrocarbons in the non-permeate stream is intermittently passed at a pressure greater than the permeate pressure to the non-permeate zone to prevent condensation of $C_6^+$ hydrocarbons in the non-permeate stream remaining in the non-permeate zone. Upon shut-down of the system, a portion of the gas mixture, preferably a sales gas flow that is depleted in carbon dioxide, is sent through a valve to reduce the pressure of the as and subsequently cool the gas into a two phase (gas/liquid) stream to be separated in a gas liquid separator with de-mister pads or other separation means known to one skilled in the art. The remaining gas becomes a purge gas stream. A quantity of nitrogen gas is added to the purge gas stream prior to contact with the residual gas in the non-permeate zone.

DETAILED DESCRIPTION OF THE INVENTION

Figure 1:
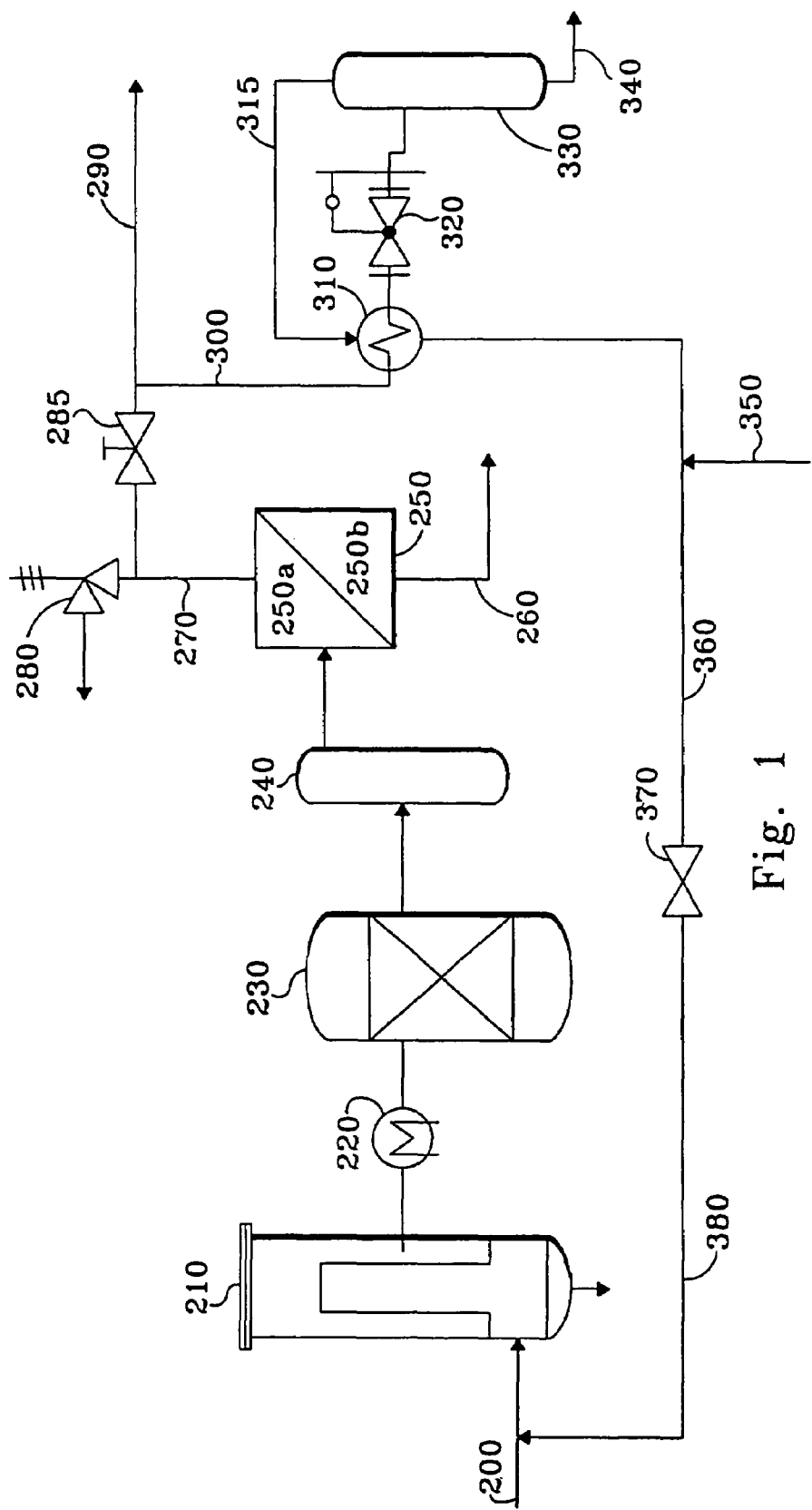
FIG. 1 is a schematic flow diagram of the process of the present invention showing the use of a purge stream to remove residual gas from a membrane module.

The invention is useful in membrane systems for the rejection of carbon dioxide from a natural gas stream to provide a purified natural gas stream which can be subsequently processed in a natural gas process plant for the further removal of heavy hydrocarbons such as $C_6^+$ hydrocarbon to provide a sales gas stream or purified natural gas stream. The gas feed stream may be passed to a membrane separation unit to provide a permeate gas stream comprising carbon dioxide and a non-permeate gas comprising light hydrocarbons. The natural gas feed stream comprises methane as well as heavy hydrocarbons, as well as water and carbon dioxide.

The term "enriched" as utilized herein is meant to refer to the concentration of a component of a product stream in relation to the concentration of that component in the feed stream. For example, the permeate stream from the membrane separation zone will be enriched in the readily permeable component relative to the concentration of the readily permeable component in the feed. The term "membrane separation zone" means one or more device having at least one membrane useful for permeating or separating readily permeable components from a feed gas mixture. As used herein, the term "dew point" means the temperature at a given pressure wherein a condensable vapor such as hydrocarbon or water begins to condense.

Permeable membranes capable of separating at least one selected component from a fluid mixture, either gas or liquids, are convenient, and potentially highly advantageous, means for achieving desirable fluid separation and/or concentration. Membranes suitable for the present invention include composite membranes such as those membranes disclosed in U.S. Pat. No. 4,822,382, which is hereby incorporated by reference.

As used in the present application, the term "intermittently" refers to a continuous process which has periods of intermission, particularly unplanned or sudden intermissions or interruptions in the normal feed flow. During these periods, the membrane must be safely shut-down to prevent damage to the membrane. Applicant provides a process for the safe shut-down of a membrane that is particularly useful for such shut-downs with no or minimal damage to the membrane.

Upon shut-down, condensation in a membrane may result from a phenomenon known as "retrograde condensation." For example, in a membrane when a mixture of gases is present, condensation may occur when the pressure is reduced. According to the present invention, a feed stream comprising a mixture of a permeable, non-condensible component and a less-readily permeable, condensible component is passed to a membrane unit. The membrane comprises a non-permeate zone from which a non-permeate stream is withdrawn and a permeate zone from which a permeate stream is withdrawn. When the membrane is subject to a sudden interruption and the termination of the flow of the feed stream to the membrane, there is a potential for condensation on the membrane. The following explanation is believed to describe the events resulting in condensation on the membrane. Although the flow of the feed stream has stopped, the permeation of the permeable, non-condensible component continues. This continuation of the permeation process often results in a decrease in pressure in the non-permeate zone of the membrane. Combined with a Joules-Thompson cooling effect as the high pressure gas permeates to the low pressure permeate side, both temperature and pressure on the non-permeate side are reduced. As the pressure in the non-permeate zone decreases, the concentration of the less-readily permeable, condensible component increases. Without some process to remove the condensable component in the non-permeate zone, the partial pressure of the less-readily permeable, condensible component may reach a point at which liquid will form and condensation will take place. The present invention acts to mitigate this retrograde condensation by purging the non-permeate zone of the membrane unit with a purge stream which maintains the partial pressure of the less-readily condensible component in the non-permeate zone above the dew point, or the point at which condensation will occur. For example, in a process for the treating of a natural gas stream, the invention comprises passing at an operating pressure a mixture of permeable, non-condensible light hydrocarbons such as $C_1$ to $C_6$ hydrocarbons and carbon dioxide and less-readily permeable, condensible components such as $C_6^+$ or $C_{10}^+$ hydrocarbons to a membrane unit having a non-permeate zone and a permeate zone. A non-permeate stream reduced in carbon dioxide is withdrawn from the non-permeate zone at a pressure essentially equal to the operating pressure, and a permeate stream enriched in carbon dioxide relative to the feed stream is withdrawn from the permeate zone at a low pressure. Suddenly terminating the feed stream flow to the membrane and the blocking of the non-permeate and permeate flows results in the decrease in pressure of the non-permeate zone as carbon dioxide continues to permeate through the membrane. The removal of carbon dioxide from the non-permeate zone by permeation increases the partial pressure of the $C_6^+$ or $C_{10}^+$ less-readily permeable, condensible component and, if not prevented, may result in condensation and damage to the membrane. According to the present invention, upon interruption of the feed stream flow, the non-permeate zone is purged with a purge stream such that the partial pressure of the less-readily permeable, condensible component is maintained above the point of condensation. This requires that the purge gas stream comprise less of the less-readily permeable, condensible component than the amount of less-readily permeable, condensible component in the non-permeate zone. Preferably, the purge gas stream reduced in the less-readily permeable, condensible component comprises less than 90 mol-% of the less-readily permeable, condensible component in the non-permeate stream, and more preferably, the purge gas stream comprises less than 10 mol-% of the less-readily permeable, condensible component in the non-permeate stream, and most preferably, the purge gas stream comprises less than about 0.1 mol-% of the less-readily permeable, condensible component in the non-permeate stream. The purge gas stream has been reduced in the less-readily permeable, condensible component through the passing of the gas stream through a Joules-Thompson valve, or otherwise reduced in pressure followed by condensation and removal of these condensible components.

Membrane operation is measured by the selectivity of the membrane and the permeability of a component through the membrane. These parameters depend upon the partial pressure driving forces between the non-permeate and permeate zones for each component. In the separation of two components in a membrane unit when the molar flow ratio of permeate flow to feed flow is low, the selectivity is the product of the ratio of the mole fractions of the components in the feed stream and the inverse ratio of the partial pressure driving force between the non-permeate and permeate zones, wherein the partial pressure driving force for a given component of a mixture is the difference between the partial pressure of the component in the feed less the partial pressure of the component in the permeate. As stated in equation form:

$$x_1 * (pp_{f2} - pp_{p2}) / x_2 * (pp_{f1} - pp_{p1})$$

wherein $x_1$ and $x_2$ are the feed mole fractions of components 1 and 2; $pp_{f1}$ and $pp_{f2}$ are the partial pressures of the components 1 and 2 in the feed stream; and $pp_{p1}$ and $pp_{p2}$ are the partial pressure of the components 1 and 2 in the permeate stream. Permeability for a low molar flow ratio of permeate flow to feed flow, expressed in terms of each component, is the flow of the component through the membrane divided by the product of the surface area of the membrane and the partial pressure driving force for that component between the feed stream and the permeate partial pressures. In equation form, the permeability of component 1 is expressed as follows:

$$F_p * x_{f1} / A * (P_h * x_{f1} - P_1 * x_{p1})$$

wherein $F_p$ is the permeate flow rate from the membrane zone; A is the surface area of the membrane; $P_h$ and $P_1$ are the total pressures of the feed stream and the permeate stream; and $x_{p1}$ and $x_{f1}$ are the mole fractions of component 1 at the permeate end and feed stream end of the membrane.

In one embodiment, the purge gas comprises a sales gas flow that is depleted in carbon dioxide, is sent through a valve to reduce the pressure of the gas and subsequently cool the gas into a two phase (gas/liquid) stream to be separated in a gas liquid separator with de-mister pads or other separation means known to one skilled in the art. The remaining gas becomes a purge gas stream. In another embodiment, the purge gas includes nitrogen gas added to the purge gas flow.

Experimental results presented herein below show that when a membrane separation unit processing a gas mixture containing a condensible component experiences a sudden loss of feed flow and during the loss of feed flow the non-permeate zone of the separation unit is purged with a purge gas which comprises less condensible component than in the non-permeate zone, damage to the membrane may be successfully prevented and possibly even improved. When condensation is followed by or results from depressurization or when condensation occurs by permitting the permeate zone pressure to rise, damage to the membrane results.

The combination of the use of a valve to reduce the pressure of the sales gas coupled with the condensation and removal of the harmful heavier hydrocarbons results in a novel approach to maintaining membrane capacity and preventing damage to membrane systems in large commercial processing plants. This allows for the processing of natural gas at higher pressures than was previously possible.

DETAILED DESCRIPTION OF THE DRAWINGS

In the drawing, the process of the present invention is illustrated by means of a simplified flow diagram in which such details as pumps, instrumentation, heat-exchange and heat-recovery circuits, compressors, and similar hardware have been deleted as being non-essential to an understanding of the techniques involved. The use of such miscellaneous equipment is well within the purview of one skilled in the art.

With reference now to FIG. 1, a hydrocarbon gas feed stream in line 200 at a separation pressure ranging from about 700 kPa (100 psia) to about 11,032 kPa (1600 psia) and a separation temperature ranging from about 25° to 60° C. is passed to a membrane separation zone 250 via line 200. Prior to passing to the membrane separation zone 250, the feed gas is purified by passing through filter coalescer 210, preheater 220, guard bed 230 and particle filter 240. The hydrocarbon gas feed stream comprises $C_1$ to $C_6$ hydrocarbons, carbon dioxide, and heavy hydrocarbons such as $C_6^+$ or $C_{10}^+$ hydrocarbons. The membrane separation zone 250 comprises a non-permeate zone 250a and a permeate zone 250b. A non-permeate stream comprising heavy hydrocarbons and having a reduced amount of carbon dioxide relative to the feed stream is withdrawn from non-permeate zone 250a at a non-permeate pressure essentially equal to the separation pressure via line 270 and a permeate stream enriched in carbon dioxide is withdrawn from permeate zone 250b at a permeate pressure ranging from about 100 kPa (15 psia) to about 1050 kPa (150 psia) via line 260.

The process is operated in an intermittent manner such that when the feed stream is unavailable, the membrane separation zone 250 is shut-down. By the process of this invention, when the feed stream in line 200 flow is interrupted, a portion of the feed stream in line 200 is passed via line 300 and valve 310 to Joules-Thompson valve 320 and to gas-liquid separator 330 to produce a purge gas stream in line 340 that comprises less than the non-permeate stream $C_6^+$ hydrocarbons. When the feed stream is not passed to the membrane separation zone 250, the purge gas stream is passed to non-permeate zone 250a via lines 360, valve 370 and line 380 to sweep any residual non-permeate gas comprising condensible $C_6^+$ hydrocarbons remaining in non-permeate zone 250a prior to reducing the pressure in the non-permeate zone. Nitrogen gas may be injected into the purge stream in line 350 to provide further insurance that the purge stream is low in hydrocarbon content. Typically, the nitrogen gas is added to provide about 25% of the purge gas stream by volume.

The condensation zone, comprising the Joules-Thompson valve 320 and the gas-liquid separator 330, is thus available during intermittent feed stream outages to provide a purge gas stream. Preferably, the purge gas stream comprises a portion of the non-permeate stream depleted in the less-readily permeable, condensible component, and more preferably, the purge gas comprises a portion of the feed gas mixture depleted in the less-readily permeable, condensible component relative to the non-permeate stream. When this purge stream is employed to sweep the residual, non-permeate gas from the non-permeate zone, the condensation of heavy hydrocarbons is prevented and damage to the membrane separation zone 250 is thus prevented. Gas may be returned to the system through line 315. Upon shut-down of the system, blow down valve 280 and shut-down valve 285 are closed to stop the flow of gas which during operation will otherwise flow through line 290 to its ultimate destination.

Figure 2:
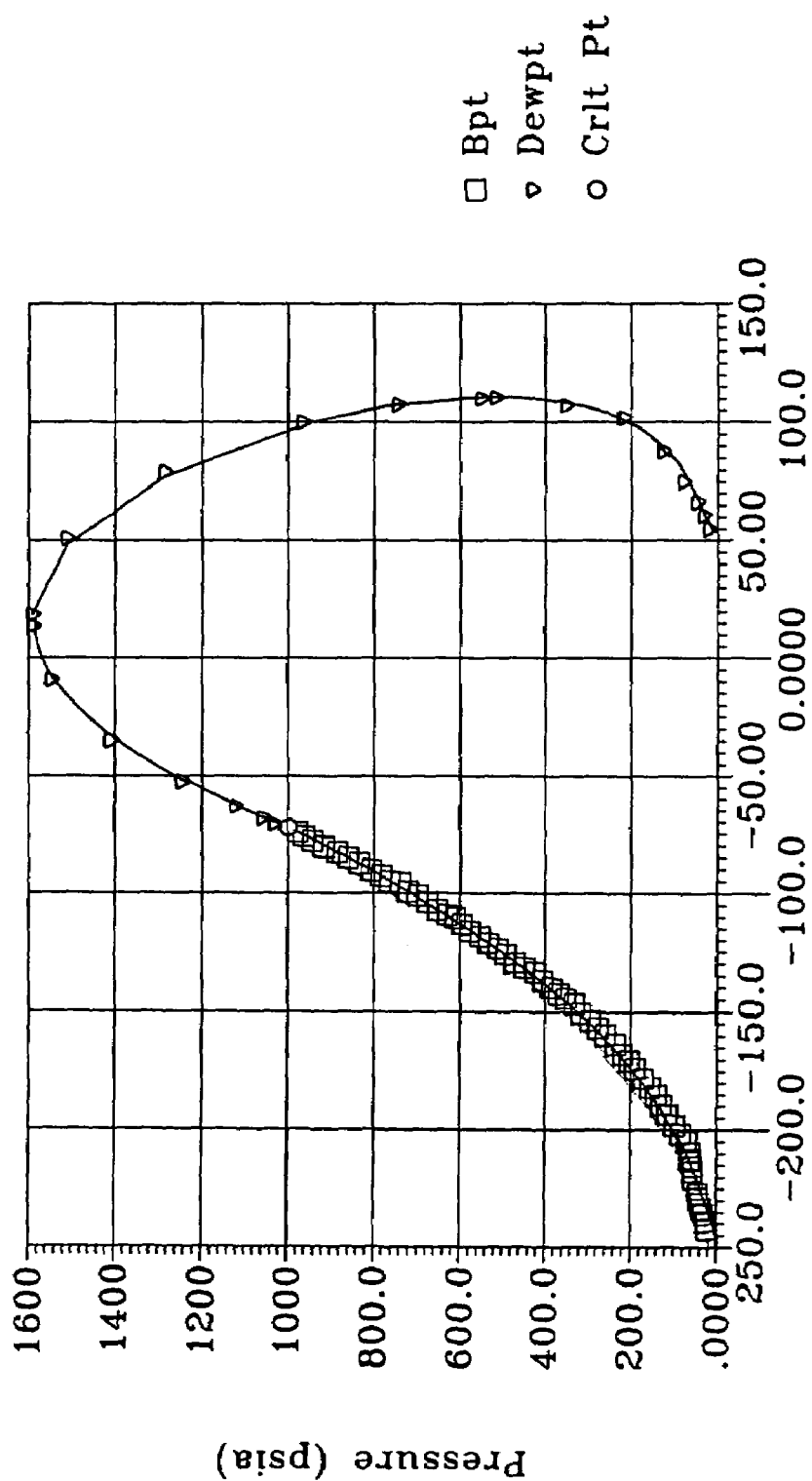
FIG. 2 is a phase envelope curve showing pressure temperature for streams treated in accordance with the present invention.

FIG. 2 shows how the treated residue stream prevents retrograde condensation. The pressure/temperature curve for residue gas after sweeping it past the membrane with Joules-Thompson valve treated gas. A plant operating at 8.2 to 11.0 MPa (1200 to 1600 psia) would not experience retrograde condensation during depressurization since operation at 49° C. (120° F.) with the operation at that temperature being to the right of the curve, which shows the temperature/pressures at which condensation would occur.

Figure 3:
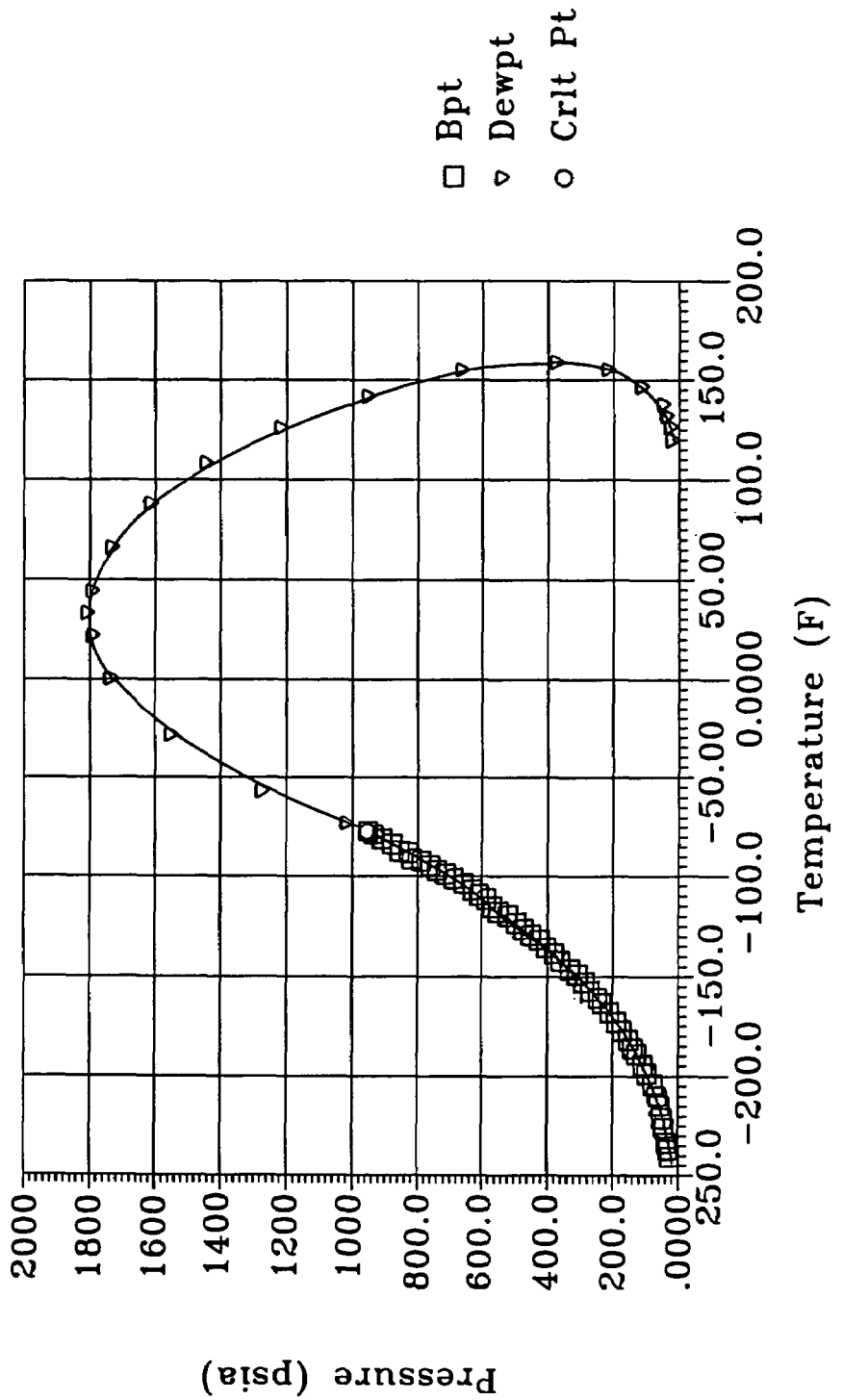
FIG. 3 is a phase envelope curve showing the conditions in which condensation will occur without treatment in accordance with the present invention.

FIG. 3 shows how a non-treated residue stream would suffer from retrograde condensation between 690 kPa and 7.6 MPa (100 and 1100 psia) during operation at 49° C. (120° F.) as compared to FIG. 2 which illustrates a wide range of operating conditions being possible with the treated stream.

The following examples are provided to illustrate the present invention and is not intended to limit the scope of the claims that follows.

EXAMPLES

The following examples of membranes operating in a potentially condensing environment were based on the performance of membrane micromodules, each containing about 2800 mm² composite membrane surface having a separation layer comprised of at least one poly(tetramethyl) bisphenol A phthalate as disclosed in U.S. Pat. No. 4,822,382. The micromodules were pressurized to a separation pressure of about 3.6 MPa (515 psia) with a prepared feed stream without the withdrawal of a non-permeate stream. The condensible-loaded gas feed stream was prepared by sparging a hydrogen gas stream of about 99.9% purity through a liquid hydrocarbon mixture of 10 vol-% benzene and 90 vol-% hexane to saturate the hydrogen gas stream with the hydrocarbon mixture at a temperature of about 24° C. (75° F.). As part of each test, the selectivity of the membrane was measured before and after the exposure to the saturated hydrogen gas stream by pressurizing the membrane micromodule with a gas mixture of 10 vol-% carbon dioxide and 90 vol-% methane. For these examples, the molar ratio of the permeate flow to the feed flow was less than 3%.

Example 1

Condensation Followed by Depressurization

In Example I, a hydrogen gas stream was sparged as described herein above and passed to a membrane micromodule for about 6 hours at a pressure of about 3.6 MPa a temperature of about 24° C. measured at the sparger while the temperature of the micromodule was maintained at about 37° C. (100° F.) without a non-permeate flow from the membrane module. The micromodule was then depressurized to atmospheric pressure. Following depressurization, a gas mixture containing 10 vol-% carbon dioxide and 90 vol-% methane was passed to the membrane micromodule to repressurize the micromodule to about 3.6 MPa (515 psia) at a temperature of about 49° C. (120° F.) and the selectivity of the membrane was determined. The results are shown in Table 1. Prior to the test, the four samples tested had selectivities of about 6 and permeabilities of about 4. As shown in column O, immediately following condensation and depressurization, the average permeability reached a value of about 46 and the selectivity was reduced to 1. Clearly, the effect of depressurization following condensation produced severe damage to the membrane. Further-more, even after the micromembrane samples were dried with the $CO_2/CH_4$ gas mixture for several days and at a temperature of about 37° C. (100° F.) and a pressure of 3.6 MPa (515 psia) the $CO_2/CH_4$ selectivity and $CO_2$ permeability did not return to original levels as shown at 4, 11, and 18 days from the point of condensation and depressurization. Thus, depressurization after condensation appeared to catastrophically damage the membrane in a manner which could not be recovered even by drying the membrane module.

TABLE 1

| | Condensation Followed by Depressurization | | | |
|---|---|---|---|---|
| | Before Condensation | Days After Condensation | | |
| | | 0 | 4 | 11 | 18 |
| $CO_2$ Permeability | 4 | 46 | 6 | 5 | 5 |
| $CO_2/CH_4$ Selectivity | 6 | 1 | 2 | 2 | 2 |

Example 2

A membrane plant is designed to operate in the super-critical region above the phase envelope. Retrograde condensation will occur as the system is depressurizing during an emergency shut-down. The change in pressure before condensation will occur is approximately 2.4 MPa (350 psia). The process disclosed will use Joules-Thompson cooling as the feed stream is decreased from 11.0 to 8.6 MPa (1600 psia to 1250 psia) to change the composition of the purge gas stream and provide ~38° C. (100° F.) circondentherm. The membrane system can then be purged with this gas and then decreased in pressure to avoid retrograde condensation.

During shut-down, a portion of the sales gas will be sent to a Joules-Thompson valve that will decrease the pressure to create a constant downstream temperature. The resulting two-phase mixture will then be separated in a gas liquid separator with de-mister pads. The gas stream from the separator will be sent to the existing filter coalescer to remove any droplets. The stream leaving the filter coalescer will be superheated heated to 54° C. (130° F.) using the existing preheater and then used to sweep the membrane skid. This process requires shut-down in two steps. The first step will allow rapid depressurization until the system reaches 8.6 MPa (1250 psia). The system will then sweep a volume of gas through the skid and then complete the depressurization process. FIGS. 2 and 3 illustrate the advantage of the present invention (FIG. 2) as compared to the result when the purge stream is not treated (FIG. 3).

To ensure adequate protection against retrograde condensation, the gas stream from the separator may be diluted with 25% nitrogen. The injection of 25% nitrogen into the purge gas will also produce a lower circondentherm or dew point. The proposed system may be a combination of both nitrogen dilution and Joules-Thompson cooling to provide redundancy if either system fails.

What is claimed is:

1. A process for the shut-down of a membrane separation zone for the removal of a readily permeable component from a feed gas mixture comprising said readily permeable component, a non-permeable component, and a less-readily permeable, condensible component, said process comprising:
   a) passing said feed gas mixture at separation conditions to said membrane zone having a non-permeate side and a permeate side to provide a non-permeate stream withdrawn from the non-permeate side and a permeate stream withdrawn from the permeate side at a permeate pressure;
   b) forming a purge stream by passing a portion of said non-permeate stream through a Joules-Thompson valve to lower the pressure and cool said portion of said non-permeate stream and then passing said portion of said non-permeate stream through a gas-liquid separator to remove said less-readily permeable, condensible component; and
   c) intermittently passing said purge stream at a pressure greater than the permeate pressure reduced in said less-readily permeable, condensible component relative to said non-permeate side of said membrane separation zone when said feed gas mixture is not passed to the membrane separation zone to remove at least a portion of a residual gas remaining in the non-permeate side before said residual gas condenses in said membrane separation zone.

2. The process of claim 1 further comprising depressurizing said membrane separation zone simultaneously with step (c).

3. The process of claim 2 wherein said less-readily permeable, condensible component comprises $C_6^+$ hydrocarbons and said readily permeable component comprises carbon dioxide.

4. The process of claim 2 wherein said readily permeable component comprises carbon dioxide.

5. The process of claim 1 wherein said purge stream is selected from the group consisting of nitrogen, methane, ethane, propane, butane, and mixtures thereof.

6. A shut-down process for a membrane separation zone comprising at least one membrane separation module having a non-permeate side at a separation pressure and a permeate side at a permeate pressure for the removal of carbon dioxide from a hydrocarbon gas feed stream comprising light hydrocarbons including $C_1$ to $C_4$ hydrocarbons, $C_6^+$ hydrocarbons, a portion of said $C_6^+$ hydrocarbons being condensable at a saturation pressure, and carbon dioxide, said shut-down process comprising:
   a) terminating the flow of a pressurized hydrocarbon feed stream at a feed pressure to said membrane separation module to provide a first residual gas stream in said non-permeate side, said first residual gas stream comprising $C_6^+$ hydrocarbons and having a reduced amount of carbon dioxide relative to said feed gas stream, and a second residual gas stream in said permeate side enriched in carbon dioxide relative to said feed stream; and
   b) purging said membrane separation module by passing a purge stream essentially free of $C_6^+$ hydrocarbons to the non-permeate side at a pressure greater than said permeate pressure and recovering at least a portion of the first residual gas stream and withdrawing said second residual gas stream from said permeate side wherein said purge stream is formed by reducing the pressure of said first residual gas stream followed by removal of impurities from said first residual gas stream through condensation.

7. The process of claim 6 further comprising depressurizing the membrane separation module to an intermediate pressure prior to purging said membrane module.

8. The process of claim 7 wherein the intermediate pressure comprises a pressure greater than or equal to about 20 percent of the feed pressure and greater than the permeate pressure.

9. The process of claim 8 further comprising continuing said purging until the $C_6^+$ hydrocarbons have reached a partial pressure comprising less than or equal to about 20 percent of said saturation pressure and further depressurizing the membrane separation module.

10. The process of claim 8 wherein said permeate pressure ranges from about 100 kPa (15 psia) to about 1050 kPa (150 psia).

* * * * *